United States Patent [19]

Desyllas et al.

[11] Patent Number: 4,714,990
[45] Date of Patent: Dec. 22, 1987

[54] DATA STORAGE APPARATUS

[75] Inventors: Peter L. L. Desyllas, Wilmslow; Nicholas P. Holt, Hadfield, Via Hyde, both of United Kingdom

[73] Assignee: International Computers Limited, London, England

[21] Appl. No.: 525,152

[22] Filed: Aug. 22, 1983

[30] Foreign Application Priority Data

Sep. 18, 1982 [GB] United Kingdom ............... 8226663

[51] Int. Cl.⁴ .................. G06F 12/12; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,840,862 | 10/1974 | Ready | 364/200 |
| 3,979,726 | 9/1976 | Lange et al. | 364/200 |
| 4,053,948 | 10/1977 | Hogan et al. | 364/200 |
| 4,068,303 | 1/1978 | Morita | 364/200 |
| 4,141,067 | 2/1979 | McLagan | 364/200 |
| 4,145,738 | 3/1979 | Inoue et al. | 364/200 |
| 4,245,304 | 1/1981 | Porter et al. | 364/200 |
| 4,326,248 | 4/1982 | Hinai et al. | 364/200 |
| 4,376,297 | 3/1983 | Anderson et al. | 364/200 |
| 4,426,682 | 1/1984 | Riffe et al. | 364/200 |
| 4,442,488 | 4/1984 | Hall | 364/200 |
| 4,467,414 | 8/1984 | Akagi et al. | 364/200 |
| 4,471,429 | 9/1984 | Porter et al. | 364/200 |
| 4,504,902 | 3/1985 | Gallaher et al. | 364/200 |
| 4,513,367 | 4/1985 | Chan et al. | 364/200 |

Primary Examiner—Thomas M. Heckler
Assistant Examiner—Kevin A. Kriess
Attorney, Agent, or Firm—Lee, Smith & Zickert

[57] ABSTRACT

Clearance arrangement for data storage apparatus. Data items D are entered into a store 10 together with a tag T equal to the current value of a counter 11. Data items are valid only while the counter 11 retains its current value. When it is desired to clear the store 10 the counter is incremented so that items with the previous tag value are rendered invalid. On some or all of such occasions a fraction of the store locations are also cleared by setting their tags to a null value. By the time the counter has completed a cycle all locations have been cleared in this way and cannot erroneously appear to contain valid data remaining from the previous cycle. The store is out of action to allow it to be cleared only for a relatively short time. Different tag counters may be used for different data types.

6 Claims, 2 Drawing Figures

DATA STORAGE APPARATUS

BACKGROUND TO THE INVENTION

This invention relates to data storage apparatus in which it is necessary from time to time to clear existing data items held in a store. One example of such apparatus is a cache or slave store for use in a data processing system in providing fast access to a number of data items copied from a larger but slower main store.

One way to clear items from a store is to provide each data item with a validity flag which is set to indicate that the item is valid, and reset to indicate invalidity. This avoids the necessity for physically clearing the data from the store.

In order to invalidate all the data in the store, it is necessary to reset all the validity flags, and this involves stepping through each location of the store in turn, resetting each flag individually. This can be very time consuming, especially if the store is large, and can therefore keep the store out of action for an inconveniently long time.

One solution to this problem is proposed in U.S. Pat. No. 4,053,948, in which the store is an address translation table. In that specification, whenever data is written into a location, it is tagged with a value obtained from a counter. That data is valid only while the counter retains its existing value and may be invalidated simply by incrementing the counter.

Eventually, the counter will reach its maximum count, and will then recycle through the same sequence of values. However, if there are still some data items left in the store with tags assigned during the previous cycle, they may be erroneously indicated as valid. This can be avoided, as descibed in the above mentioned specification, by causing the whole store to be invalidated when the counter recycles through zero using one of the previous methods e.g. by resetting validity flags. However, this leads back to the same problem as before, that resetting all the validity flags in the store is a very lengthy process.

One object of the present invention is to avoid this problem.

SUMMARY OF THE INVENTION

According to the invention there is provided data storage apparatus comprising:

(a) a cyclic counter (b) a data store having a plurality of individually addressable locations each of which is arranged to contain a data item and an associated tag which is set to the value of the counter when the data item is written into the store, (c) means for comparing the tag read out from a currently addressed location of the store with the current value of the counter for determining if the data item is valid, (d) means for incrementing the value of the counter so as to render invalid all data items with a tag equal to the preceding value of the counter, and (e) means operative at some at least of the occasions the counter is incremented to clear, at each occasion it is so operative, a fraction of the locations in the store, the fractions being so selected that by the time the counter has been incremented through a complete cycle of values every location in the store will have been cleared.

In this way, the long delay associated with clearing the whole store is avoided.

The clearing of the store locations may be performed by physically resetting the data items to a null value, or by resetting a validity flag. However, in a preferred embodiment of the invention, the clearing is performed by setting the tag to a particular value (e.g. zero) which signifies invalidity.

In the preferred embodiment of the invention, the store holds a purality of different types of data, and the apparatus includes an equal plurality of counters, each for providing tag values corresponding to a different one of the data types, the said counters in operation not always being incremented simultaneously.

BRIEF DESCRIPTION OF THE DRAWINGS

Two embodiments of the invention will now be described, by way of example, with reference to the accompanying drawings of which.

DESCRIPTION OF THE EMBODIMENTS OF THE INVENTION

Figure 1:
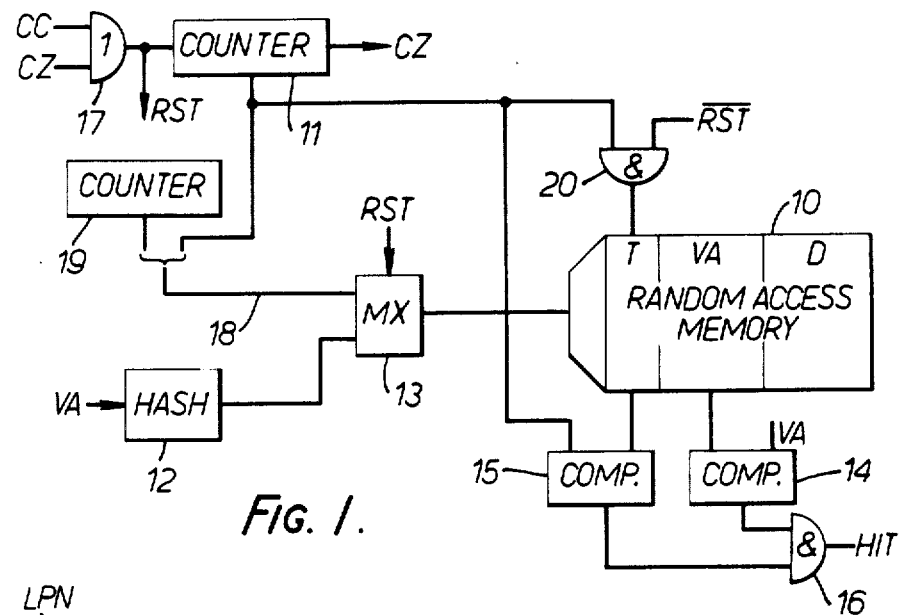
FIG. 1 is a block diagram of a first cache store arrangement.

Referring to FIG. 1, the first cache store arrangement includes a random access memory (RAM) 10 having 16K (=16,384) individually addressable locations. Each location contains the following three fields:

(a) a 32-bit data item D;

(b) a 32-bit virtual address VA identifying the data item;

(c) an 8-bit tag T.

The data item may be either an operand for processing, or a program instruction for execution, or control information such as a page table entry.

Each data item is considered valid only if its tag T is non-zero and is equal to the value of an 8-bit counter 11.

The cache store is addressed by means of a 32-bit virtual address VA. This is encoded by a hash-coding circuit 12 to produce a 14-bit store address. This is applied to the address input of the RAM 10, by way of a multiplexer 13, so as to select one of the locations in the RAM for reading or writing. The hash-coding circuit 12 may conveniently consist of a set of fourteen exclusive-OR gates each of which combines two of the bits of the input virtual address, according to some irregular pattern, to produce one of the fourteen address bits for the RAM 10. Hash-coded addressing is well known in the art and so it is not necessary to explain the details of it in this specification.

Whenever data is written into the RAM 10, the input virtual address VA is written into the selected location alongside the data. At the same time, the current tag value in the counter 11 is written into the tag field of the same location. Thus, each data item when first written into the RAM has a tag value equal to the current value of the counter 11, signifying that the data is valid.

In the case of a read from the RAM 10, two checks are made as follows:

(a) The virtual address field of the selected location of the RAM is compared with the input virtual address VA by means of a comparator 14. This determines whether the data item is the desired item as identified by the input virtual address VA.

(b) The tag field of the selected location is compared in a comparator 15 with the current value of the counter 11. This checks that the data item is valid.

The results of these two tests are combined in an AND gate 16 to produce a HIT signal which indicates that the data item is the desired item and that it is valid.

From time to time it is desired to clear the cache. For example, if data is written into the main store without also being written into the cache, the cache will no longer be trustworthy and must be cleared. To clear the cache a control signal CC (clear cache) is applied to the cache store arrangement. This signal increments the counter 11, so that it now has a value different from the tags of all those items which were previously valid. They will therefore no longer match the current value of the counter when read out.

When the counter reaches its maximum count of 255, the next time it is incremented it overflows and returns to zero. Since zero represents invalidity, it is necessary immediately to increment the counter again to the value one. This is achieved by a control signal CZ (count zero) which is combined with the signal CC in an OR gate 17 to produce the incrementing signal for the counter 11.

The output of the OR gate 17 also produces a control signal RST (reset tags) which initiates the clearing of a fraction of the RAM 10, as follows. The signal RST switches the multiplexer 13 so that, instead of selecting the hash address from the hash coder 12, it now selects a 14-bit address on a path 18. This address is formed by combining the contents of the counter 11 (8 bits) with the contents of a further counter 19 (6 bits). The counter 19 is cycled successively through its 64 states, and thus addresses 64 different locations in the RAM. The signal RST also disables an AND gate 20 connected to the input of the tag field of the RAM 10. Thus, each addressed location has its tag field set to zero signifying that the data in that field is invalid.

In summary, it can be seen that each time the counter 11 is incremented, the control signal RST initiates the clearing of 64 locations in the RAM 10, by resetting their tag fields to zero. These 64 locations constitute 1/256th of the RAM. Thus, by the time the counter 11 has been incremented 256 times, the whole of the RAM 10 will have been cleared. Hence, when the counter 11 recycles to any particular value, it is guaranteed that any data items which were allocated that tag value during the previous cycle of the counter 11 must already have been cleared.

Figure 2:
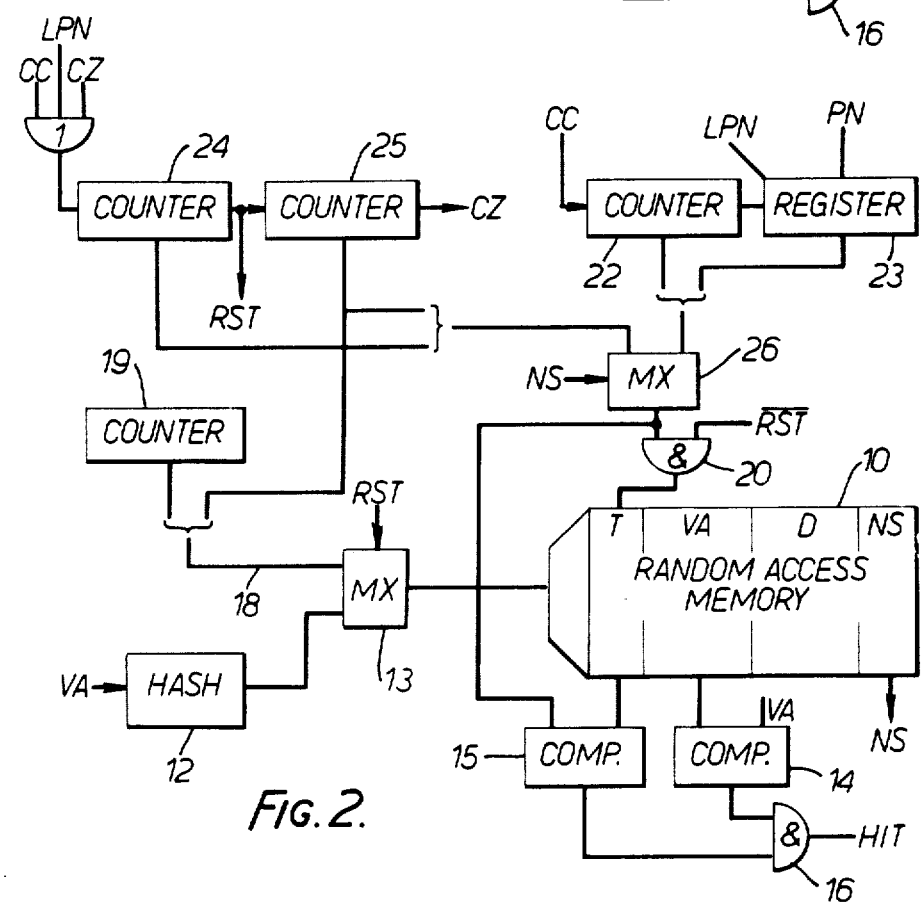
FIG. 2 is a block diagram of a second cache store arrangement.

Referring now to FIG. 2, this shows a preferred embodiment of the invention. Items which correspond to features in FIG. 1 are given the same reference numerals.

As in the case of FIG. 1, the cache store comprises a RAM 10 having 16K locations each of which holds a data item, a virtual address, and a tag. As before the RAM is addressed by hash-coding the input virtual address, and checks are made by means of comparators 14,15 to determine whether the address location contains the correct data item and is valid.

In this case, each location in the RAM also has a flag bit NS which indicates whether the data is normal (NS=0) or temporarily slaved (NS=1). Temporarily slaved data is for example shared between a number of different programs and must be cleared from the cache whenever there is a change of program.

Also, each tag field now has sixteen instead of eight bits. In the case of normal data, the extra eight bits serve as a program number to identify which program the data is associated with. In the case of temporarily slaved data it is not necessary to have any program identifier since such data must always be associated with the program which is currently running. Instead, the extra eight bits serve as an extension of the tag.

The tag counter 11 (FIG. 1) is replaced by two tag indicators, one for normal data and one for temporarily slaved data. The normal data tag indicator consists of an 8-bit counter 22 holding the tag, and and 8-bit register 23 which holds the program number of the currently running program. The counter 22 is incremented by a control signal CC whenever it is desired to clear the cache. When a new program is initiated, the contents of the register 23 are altered by loading the program number PN of the new program into it under control of a signal LPN (load PN).

The tag indicator for temporarily slaved data consists of two 8-bit counters 24,25 connected together to form a 16-bit counter. The counter 24 is incremented by the OR-function of the signals CC, LPN and CZ.

For a Read access, the NS flag from the currently addressed location of the RAM 10 controls a multiplexer 26 which selects between the outputs of the two tag indicators 22,23 and 24,25. Thus, when NS=0, the multiplexer 26 selects the indicator 22,23 and, when NS=1, it selects the indicator 24,25. The multiplexer output is also fed to the comparator 15 where it is compared with the output of the tag field. For a Write access the output of the multiplexer 26, selected in accordance with the data type, is fed to the input of the tag field of the RAM 10 by way of the AND gate 20.

When normal data is read out both the tag and the program number of the data item retrieved must match the values stored in the counter 22 and register 23. If either does not match, the comparator 15 will indicate inequality, and hence that the item is invalid. Data that is invalid because the program number has been changed may be rendered valid again by restoring the previous value of the program number if that is done before the next CC signal.

In this embodiment, the control signal RST (reset tags) is derived from the overflow signal from the counter 24, which also increments the counter 25. As before, the signal RST switches the multiplexer 13 so as to select the address on path 18 instead of the hash address. The address on path 18 is formed by combining the contents of the counters 19 and 25 in this case. As before, the signal RST also disables the AND gate 20 so as to cause the value zero to be input to the tag field.

In summary, it can be seen that the CC signal increments both counters 22 and 24 and hence invalidates all data items in the cache, both normal and temporarily slaved. The counter 24 is also incremented by the LPN signal whenever a new program number is loaded, causing all temporarily slaved data to be invalidated. In general, changes of program occur much more frequently than CC signals, and as a result it is found that the counter 25 is incremented more rapidly than the counter 22 and therefore makes a complete cycle in a shorter time. This is why the control signal RST is derived from the incrementing signal to the counter 25, rather than from the incrementing signal for counter 22.

It will be realised that numerical details such as the store size are given purely for illustration and may be varied to suit the particular implementation. However, those given do show the benefits achievable by use of the invention.

At any one time only 64 locations (normally) or 128 locations (when the tag counter passes through zero) are cleared. These are respectively 1/256 and 1/158 of the total number of store locations, and can be cleared in a comparable fraction of the time taken to clear the whole store. During the time the store is out of action to be cleared events may occur, such as certain kinds of interrupt, which necessitate accessing the store. Then the longer the store is out of action the greater the inconvenience. For example, the store may be associated with a processor which is one element of a multi-processor system as described in copending European Patent Application No. 83 300 816.8, publication No. 0092895/U.S. patent application Ser. No. 467,384 issued as U.S. Pat. No. 4,652,539. In that system some data items are shared by more than one processor. An item of shared data updated by one processor is broadcast to the others to ensure that they all hold the same version of the item. If a store is out of action for a long period while it is cleared more of the such items may be received from other processors than can be coped with—for example, buffers may overflow and items be lost. By clearing the store a fraction at a time the period it is out of action can be reduced to a level which overcomes this difficulty.

What is claimed is:

1. Data storage apparatus comprising:
   (a) a cyclic counter,
   (b) a data store having a plurality of individually addressable locations each of which is arranged to contain a data item and an associated tag, which tag is set to the value of the counter when the data item is written into the store,
   (c) means for comparing the tag read out from a currently addressed location of the store with the current value of the counter and operative to generate a signal, indicating that the data item is valid, in response to the tag being equal to the current value in the counter,
   (d) means for incrementing the value of the counter so as to render invalid all data items with a tag equal to a preceding value of the counter, and
   (e) clearing means operative at n points in each cycle of the counter, where n is an integer greater than 1, to use the value in said counter to address and clear a different portion of the store at each of said n points, each said portion comprising 1/nth of the store, whereby, by the time the counter has been incremented through a complete cycle of values, every location in the store will have been cleared.

2. Apparatus as claimed in claim 1, in which the store holds a plurality of different types of data, and the apparatus includes an equal plurality of counters each for providing tag values corresponding to a different one of the data types, and including means operable to increment at least one counter independently of other counters.

3. Appartus as claimed in claim 2, in which the data stored in any location includes a flag indicating the data type, which flag controls a selector circuit for selecting the value of the corresponding counter for comparison when the contents of the location are read out.

4. Apparatus as claimed in claim 1, in which the clearing means comprises means for setting the tag of each of those locations to a value signifying invalidity.

5. Apparatus as claimed in claim 4, in which the said value signifying invalidity is one of the values reached by the counter in counting cyclically, and including means operative in response to the counter reaching that value to increment the counter again before any data is written into the store.

6. Apparatus as claimed in claim 1 wherein the clearing means comprises
   (a) counter means operative to produce a sequence of count values,
   (b) means for combining said sequence of count values with the current value in said counter, to produce a sequence of reset addresses,
   (c) means for applying said sequence of reset addresses to the store to address a sequence of locations in said store, and
   (d) means for clearing each of said sequence of locations as it is addressed.

* * * * *